US011635184B2

(12) United States Patent
Fladhammer

(10) Patent No.: US 11,635,184 B2
(45) Date of Patent: Apr. 25, 2023

(54) BLIND BOSS BALL SOCKET ASSEMBLY

(71) Applicant: Asyst Technologies L.L.C., Kenosha, WI (US)

(72) Inventor: Scott Fladhammer, Caledonia, WI (US)

(73) Assignee: Asyst Technologies L.L.C., Kenosha, WI (US)

(*) Notice: Subject to any disclaimer, the term of this patent is extended or adjusted under 35 U.S.C. 154(b) by 78 days.

(21) Appl. No.: 17/305,670

(22) Filed: Jul. 13, 2021

(65) Prior Publication Data
US 2022/0018509 A1  Jan. 20, 2022

Related U.S. Application Data

(60) Provisional application No. 63/051,566, filed on Jul. 14, 2020.

(51) Int. Cl.
*F21S 41/19* (2018.01)
*F16C 11/06* (2006.01)
*F21S 41/141* (2018.01)

(52) U.S. Cl.
CPC ......... *F21S 41/192* (2018.01); *F16C 11/0623* (2013.01); *F21S 41/198* (2018.01); *F21S 41/141* (2018.01)

(58) Field of Classification Search
CPC . F16C 11/0657; F16C 11/069; F16C 11/0623; F16C 11/0638; F21S 41/141;
(Continued)

(56) References Cited

U.S. PATENT DOCUMENTS 5,163,773 A * 11/1992 Denney ................ F16C 11/069
403/140
5,580,204 A * 12/1996 Hultman ................ F16B 5/065
24/297
(Continued)

FOREIGN PATENT DOCUMENTS

GB  2303667 B2  7/1997

OTHER PUBLICATIONS

Written Opinion of the International Searching Authority for related PCT Patent Application No. PCT/US2021/070864 dated Dec. 1, 2021.

*Primary Examiner* — Daniel J Wiley
(74) *Attorney, Agent, or Firm* — James A. Joyce; Godfrey & Kahn, S.C.

(57) ABSTRACT

A ball socket assembly is provided that includes a ball socket having a socket base with a plurality of socket legs extending therefrom, the socket legs include ball stud interface surfaces forming a ball cavity for receiving and selectively engaging a ball head of a ball stud, a plurality of slots extending between the plurality of socket legs, a lower abutment wall having a bend line and situated in the socket base, and a flexible securing substrate positioned under the lower abutment wall, the socket assembly further including a mating boss substrate having a first boss inner passage with a first passage inside diameter, a second boss inner passage having a second passage inside diameter, wherein the first passage inside diameter is greater than the second passage inside diameter, a boss transition wall between the first boss inner passage and the second boss inner passage, and a boss bottom.

20 Claims, 16 Drawing Sheets

(58) Field of Classification Search
CPC .......... F21S 41/192; F21S 41/198; Y10T 403/32632; Y10T 403/32737
See application file for complete search history.

(56) References Cited

U.S. PATENT DOCUMENTS

| | | | |
|---|---|---|---|
| 6,247,868 B1 | 6/2001 | Burton | |
| 6,692,176 B1* | 2/2004 | Fladhammer | F16C 11/0695 403/135 |
| 6,758,622 B2 | 7/2004 | Burton | |
| 6,837,716 B1* | 1/2005 | Brazas | F16C 11/0657 439/8 |
| 7,845,837 B2* | 12/2010 | Burton | F16C 11/069 362/528 |
| 7,963,715 B2* | 6/2011 | Burton | F16C 11/0657 403/135 |
| 9,987,972 B2* | 6/2018 | Burton | F16C 11/0657 |
| 11,149,785 B2* | 10/2021 | Fladhammer | F16C 11/0623 |
| 2005/0175398 A1* | 8/2005 | Contero | B60T 7/06 403/122 |
| 2005/0191119 A1* | 9/2005 | Aoshima | F16C 11/0604 403/122 |
| 2009/0257239 A1 | 10/2009 | Burton | |
| 2013/0050861 A1 | 2/2013 | Tsai et al. | |
| 2013/0236238 A1* | 9/2013 | Burton | F16C 11/06 403/135 |
| 2015/0232016 A1 | 8/2015 | Burton | |
| 2019/0368535 A1 | 12/2019 | Recker | |
| 2020/0355217 A1* | 11/2020 | Fladhammer | F16C 11/0695 |

\* cited by examiner

BLIND BOSS BALL SOCKET ASSEMBLY

CROSS-REFERENCE

This application is based on U.S. Provisional Patent Application Ser. No. 63/051,566 filed on Jul. 14, 2020, of which priority is claimed and the disclosure of which is incorporated herein by reference for all purposes.

FIELD OF THE INVENTION

The present invention relates generally to ball socket connection systems for lamp assemblies. More particularly, the present invention relates to a multi-stage ball socket assembly for securing a ball stud.

BACKGROUND

It is common, in automobiles, to use a ball joint assembly consisting of a ball socket and mating male spherical ball to secure and aid in the positioning of the light source in a headlamp or fog lamp assembly. As newer technologies and automotive style initiatives have developed, headlamp connection systems have also had to develop to meet the needs of this evolution. Some changes include the need for dynamic travel after the system has been initially installed. Other changes are the change to headlamp systems, like LED style systems, that require consistency at elevated temperatures, increased off-axis angle usage, and higher system retention forces to offset the increased mass of LED style systems. Another change is the reduction in the ball stud ball head spherical diameter. A smaller ball head diameter reduces the available retention surface area typically utilized with traditional techniques. Various attempts have been made to apply undercuts or lock-edges to the head granting additional resistance from extraction. The undercuts can suffice if the pull force is axial, but when the system is required to rotate off-axis, the lock-edge foreshortens and loses its effectiveness, either restricting the system from off-axis rotation or escaping the associated socket locking geometries. Along with the desire to have improved retention there is a need to couple this with a ball socket that allows assembly into a blind boss mating geometry.

As the design of motor vehicle systems continue to develop, the requirements for improvements with automotive interconnection components like ball sockets also continue to develop. There are many prior designs for sockets including, among others, the devices disclosed in U.S. Pat. Nos. 6,692,176; 6,247,868; 6,758,622; and 9,987972, although these designs suffer from various shortcomings.

As ball diameters decrease to answer specific requirements like material, weight, and size reduction while being contrasted with higher requirements for off axis travel, temperature, and pull out forces, retaining adequate hold on the ball studs becomes more difficult. As such, there is a need for an improved ball socket assembly that can be utilized for multiple ball diameters, and can utilize the entire system to allow easy insertion with improved retention even at increased off-axis rotation requirements while also providing assembly into a blind boss mating geometry.

SUMMARY OF THE INVENTION

In at least some other embodiments, a ball socket assembly is disclosed that includes: a ball socket comprising: a socket base having a plurality of socket legs extending therefrom, wherein the socket legs include ball stud interface surfaces forming a ball cavity for receiving and selectively engaging a ball head of a ball stud; a plurality of slots extending between the plurality of socket legs; a lower abutment wall having a bend line and situated in the socket base; and a flexible securing substrate having a plurality of tangs and positioned under the lower abutment wall and substantially centered about the bend line, wherein the tangs extend outward from the socket base; and a mating boss substrate comprising: a first boss inner passage having a first passage inside diameter; a second boss inner passage having a second passage inside diameter, wherein the first passage inside diameter is greater than the second passage inside diameter; a boss transition wall that extends between the first boss inner passage and the second boss inner passage; and a boss bottom situated under the second boss inner passage.

In at least some further embodiments, a ball socket assembly is disclosed that includes: a ball socket comprising: a socket base having an upper base portion and a lower base portion, and a plurality of socket legs extending from the socket base, wherein the socket legs include ball stud interface surfaces forming a ball head cavity for receiving and selectively engaging a ball head of a ball stud; a lower abutment wall having a central bend line and situated in the socket base; and a flexible securing substrate having a plurality of tangs and positioned under the lower abutment wall; and a mating boss substrate comprising: a first boss inner passage sized and shaped to matingly receive therein the upper base portion of the ball socket; and a second boss inner passage, wherein the second boss inner passage is sized and shaped to matingly receive therein the lower base portion of the ball socket.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

Embodiments of the invention are disclosed with reference to the accompanying drawings and are for illustrative purposes only. The invention is not limited in application to the details of construction or the arrangement of the components illustrated in the drawings. The invention is capable of other embodiments or of being practiced or carried out in other various ways.

DETAILED DESCRIPTION

Figure 1:
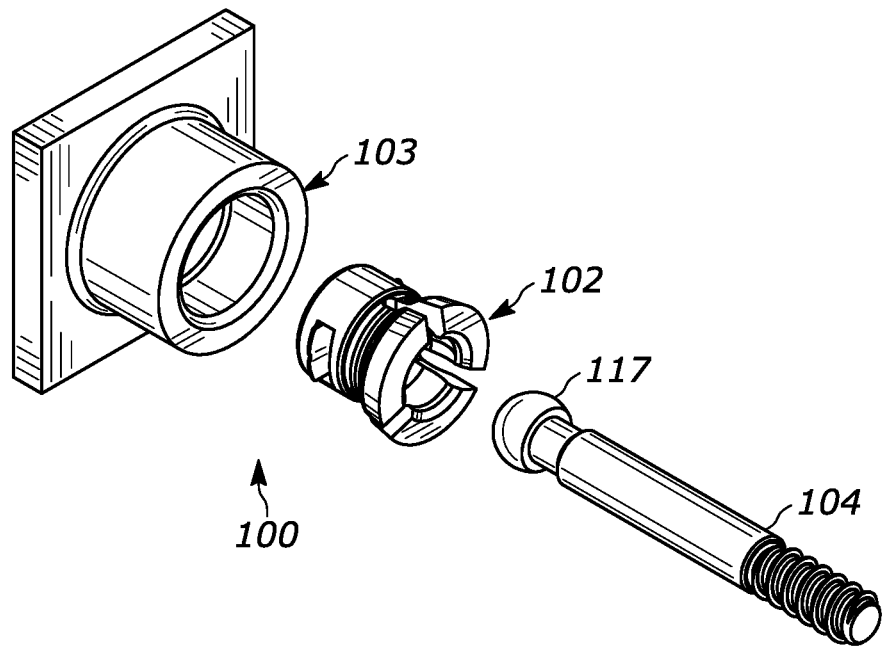
FIG. 1 is a perspective view of a ball stud and an exemplary ball socket assembly comprising a ball socket and a mating boss substrate.
Figure 2:
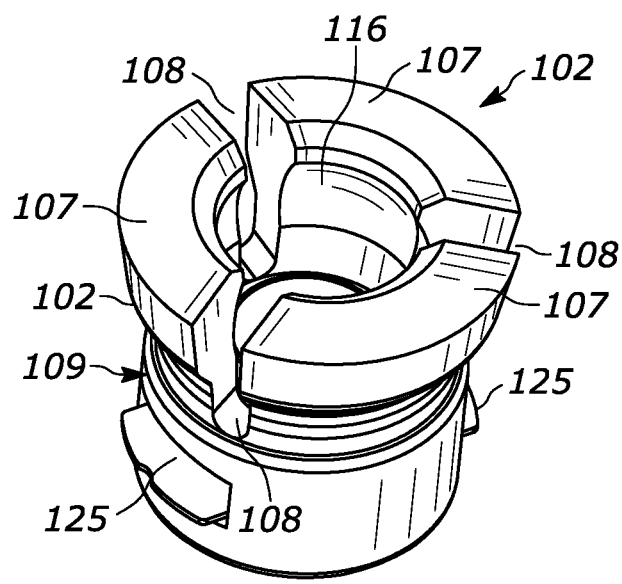
FIG. 2 is a top perspective view of the ball socket of FIG. 1.
Figure 3:
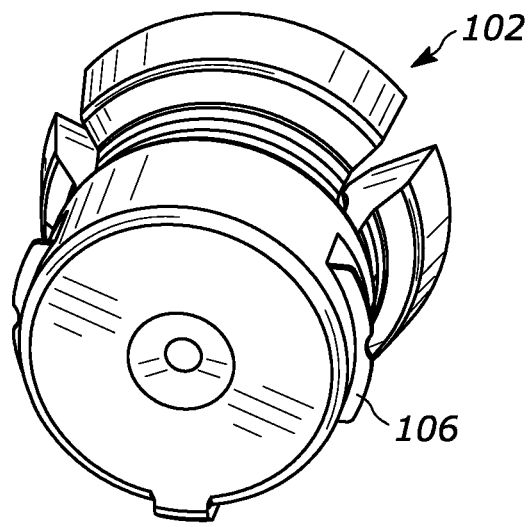
FIG. 3 is a bottom perspective view of the ball socket of FIG. 1.
Figure 4:
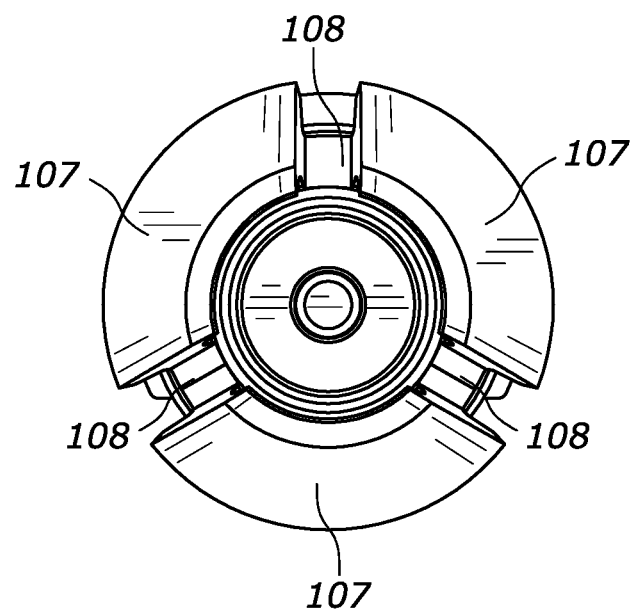
FIG. 4 is a top view of the ball socket of FIG. 1.
Figure 5:
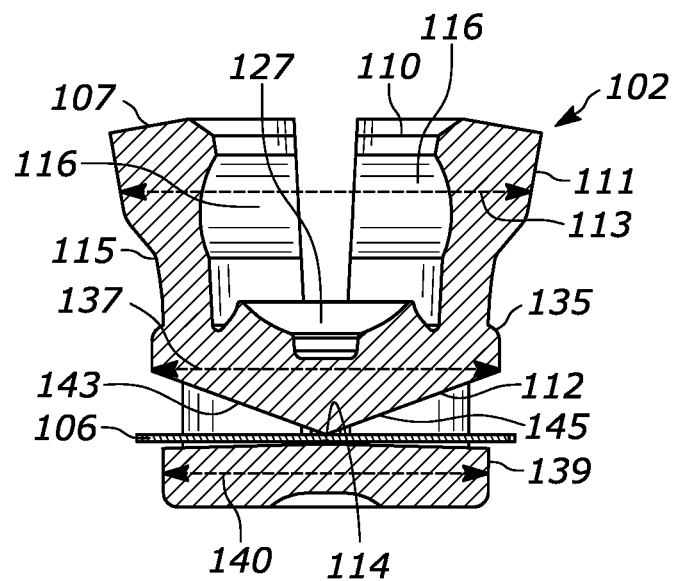
FIG. 5 is a cross-section view of the ball socket shown in FIG. 4.

Referring to FIG. 1, an exemplary embodiment of a ball socket assembly 100 and a ball stud 104 are shown. The ball socket assembly 100 includes a ball socket 102 configured for engagement with a mating boss substrate 103. The ball stud 104 is received by the ball socket 102 which then further engages the mating boss substrate 103.

FIGS. 2-5 represent various views of the ball socket 102. The ball socket 102 includes a generally cylindrical socket base 109 with a plurality of socket legs 107 extending therefrom, a plurality of slots 108 situated between the socket legs 107, a lower abutment wall 112 extending across a central bend line 114, a flexible securing substrate 106 positioned under the lower abutment wall 112 and bend line 114, a partially spherical ball head cavity 127, and ball stud interface surfaces 116. The ball stud interface surfaces 116 are generally curved to matingly receive and engage a generally spherical ball head 117 of the ball stud 104, such that the ball head 117 is retained while allowing for axial movement. The socket legs 107 can further include socket outer leg engagement surfaces 111 that taper downward toward the socket base 109, and wherein an outer diameter 113 extends about the ball socket 102 between the socket outer leg engagement surfaces 111. The socket base 109 further includes an upper base portion 135 with an upper base portion diameter 137 and a lower base portion 139 with a lower base portion diameter 140. In at least some embodiments, the lower abutment wall 112 is generally V-shaped extending upwards from the bend line 114 and away from the lower base portion 139 to form a first abutment surface 143 and a second abutment surface 145. Further, in at least some embodiments, the lower abutment wall 112 is generally planar as it extends from the bend line 114. In at least some embodiments, the bend line can extend perpendicular to the securing substrate 106. Further, in at least some embodiments, the outer diameter 113 is greater than the upper base portion diameter 137 and/or the lower base portion diameter 140. Other shapes and configurations of the lower abutment wall 112 have been contemplated. The securing substrate 106 can utilize various materials, shapes, and configurations. In at least some embodiments, the securing substrate 106 is formed of stamped metal. The securing substrate 106 further includes protruding tangs 125 that in at least some embodiments, extend beyond the lower base portion 139 and upper base portion 135.

Figure 6:
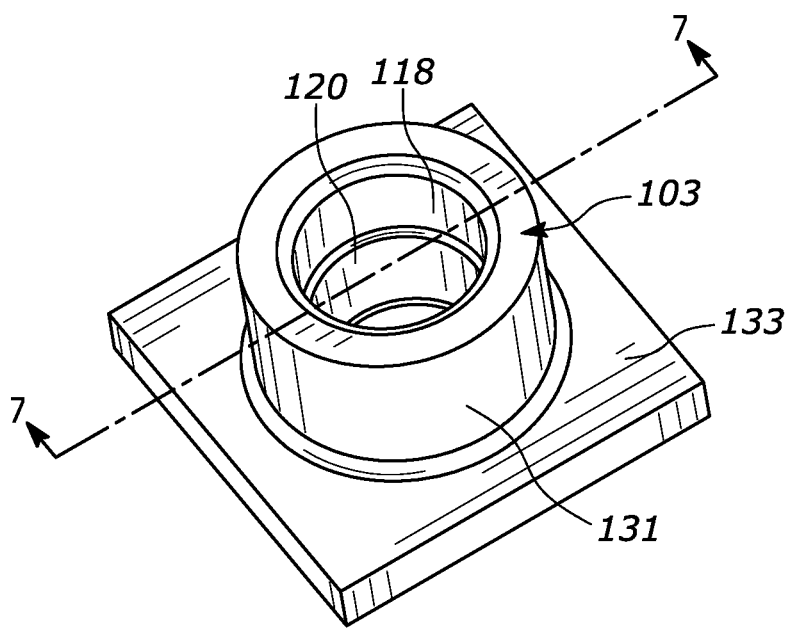
FIG. 6 is a perspective view of the mating boss substrate of FIG. 1.
Figure 7:
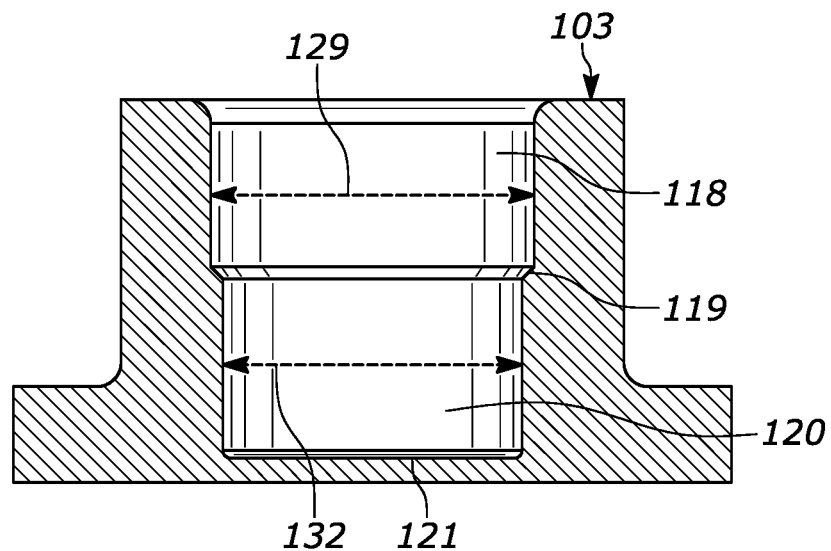
FIG. 7 is a cross-section view of the mating boss substrate taken along lines 7-7 of FIG. 6.

FIG. 1 also illustrates an exemplary known ball stud 104, which includes the spherical ball head 117 sized and shaped to be received and secured by the ball socket 102. FIGS. 6 and 7 show features of the exemplary mating boss substrate 103. These features include a first boss inner passage 118 having a first passage inside diameter 129, a second boss inner passage 120 having a second passage inside diameter 132, a boss transition wall 119 that extends between the first boss inner passage 118 and second boss inner passage 120, and boss bottom 121. In at least some embodiments, the first passage inside diameter 129 is greater than the second passage inside diameter 132. In addition, the first boss inner passage 118 is sized and shaped to receive and compress inward the socket outer leg engagement surfaces 111 of the ball socket 102, while the second boss inner passage 120 is sized and shaped to matingly receive therein the lower base portion 139 of the ball socket 102. The features shown represent one of multiple geometries that could be utilized to aid in the orientation and assembly process. In addition, the mating boss substrate 103 can take numerous forms including various shapes, sizes, and materials, and can be included as an integral part of an automotive component/assembly (e.g., automotive headlamp housing) or as a stand-alone component that is securable to an automotive component/ assembly. In at least some embodiments, the mating boss substrate 103 is formed as part of a lighting assembly, while in other embodiments, the mating boss substrate 103 is formed as part of an automobile that the lighting assembly is secured to. For illustrative purposes, the mating boss substrate 103 is shown in the form of a cylinder 131 that extends from a flange 133, wherein the cylinder 131 or flange 133 can be part of a lighting assembly or automobile, although the cylinder 131 can effectively be recessed/integrally formed so as not to protrude from a surface in whole or in part.

Figure 8:
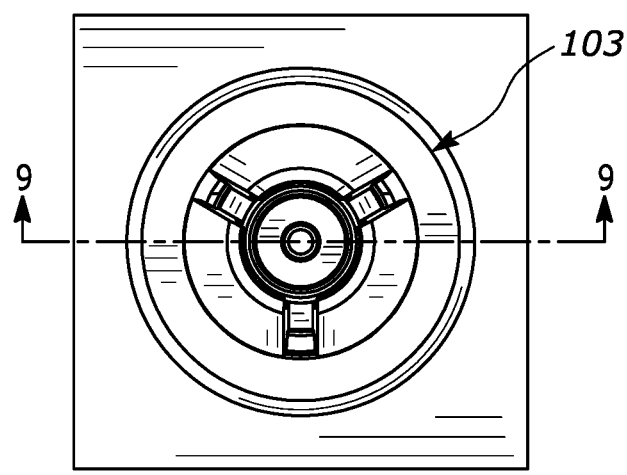
FIG. 8 is a top view of the ball socket assembly with the ball socket assembled with the mating boss substrate in an exemplary first stage assembly position.
Figure 9:
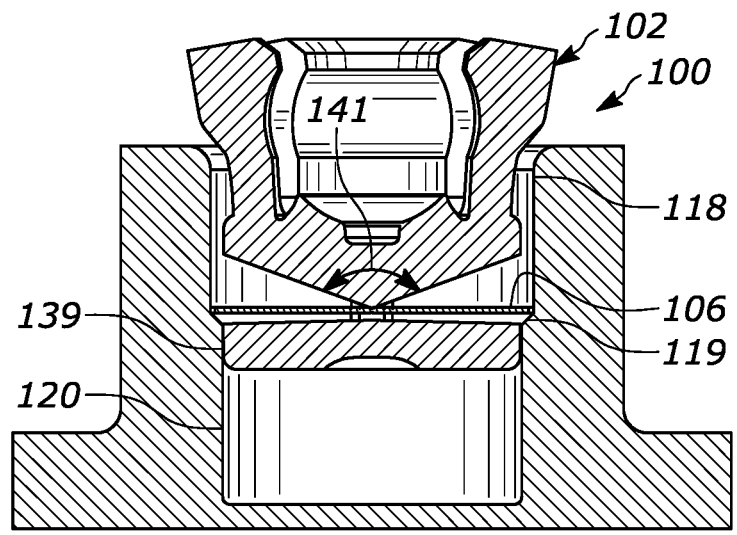
FIG. 9 is a cross-section view of the ball socket assembly taken along lines 9-9 of FIG. 8.

FIG. 8 is a top view of the ball socket assembly 100 with the ball socket 102 assembled with the mating boss substrate 103 in an exemplary first stage assembly position. FIG. 9 is a cross-section view of the ball socket assembly taken along lines 9-9 of FIG. 8. In this state the ball socket 102 is installed into the mating boss substrate 103 at a controlled height by utilizing the interaction between the securing substrate 106 and boss transition wall 119. Retention of the ball socket 102 into the mating boss substrate 103 is controlled by the interaction of the securing substrate 106 engaging the first boss inner passage 118 by means of a controlled level of interference. Center alignment of the ball socket 102 relative to the mating boss substrate 103 in the first stage assembly position is controlled by the mating interface between the lower base portion diameter 140 and the second boss inner passage 120. At this stage, the ball socket 102 has been partially installed into the mating boss substrate 103 and the ball stud 104 has not be introduced.

Figure 10:
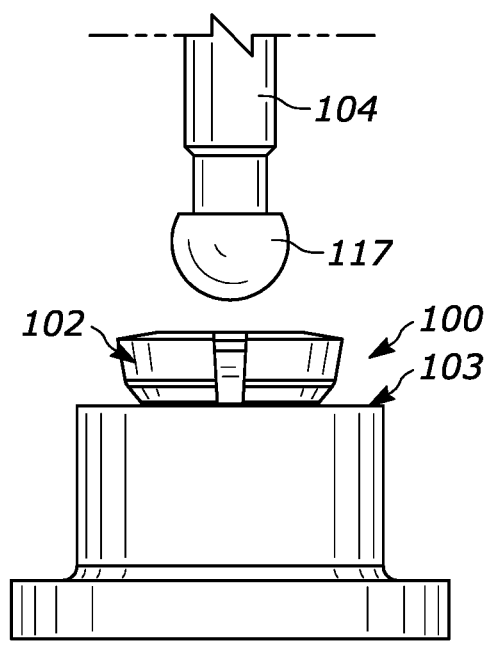
FIG. 10 is a side view illustrating the first stage assembly position of the ball socket in the mating boss substrate, and with the ball stud shown prior to installation into the ball socket.
Figure 11:
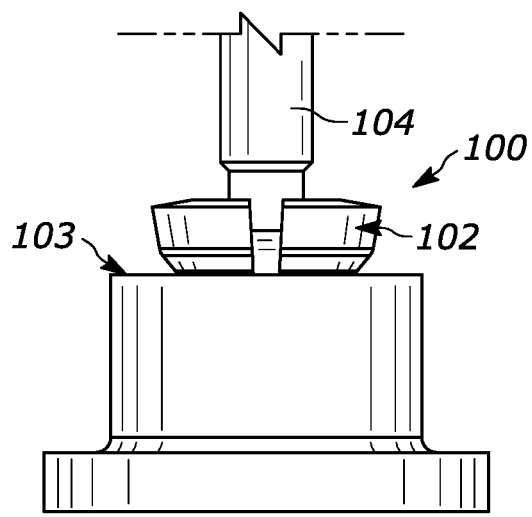
FIG. 11 is a side view of the first stage assembly position of the ball socket in the mating boss substrate with the ball stud installed in the ball socket.
Figure 12:
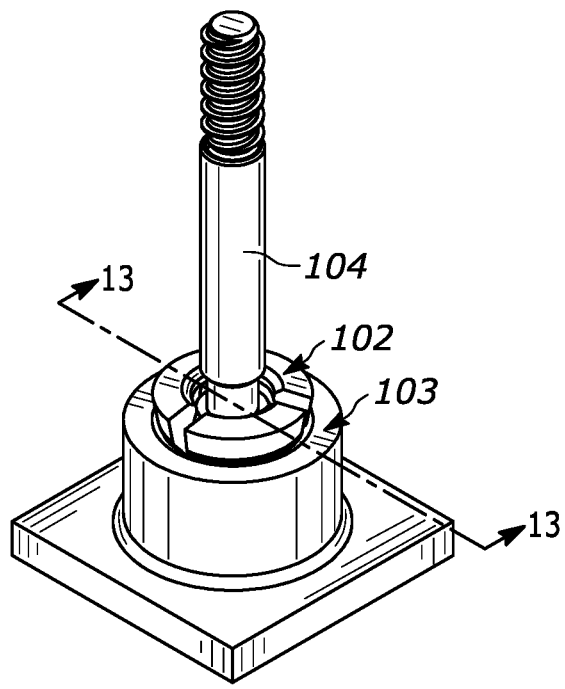
FIG. 12 is a perspective view of the ball socket assembly and ball stud of FIG. 11.
Figure 13:
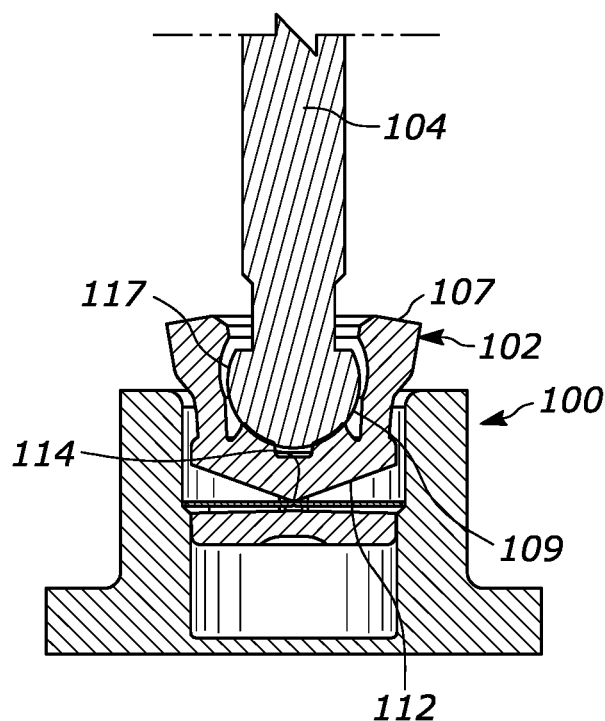
FIG. 13 is a cross-section view of the ball socket assembly and ball stud taken along line 13-13 of FIG. 12.

FIG. 10 is a side view illustrating the first stage assembly position of the ball socket in the mating boss substrate, and with the ball stud shown prior to installation into the ball socket 102. FIG. 11 is a side view of the first stage assembly position of the ball socket 102 in the mating boss substrate 103 with the ball head 117 installed in the ball socket 102. FIG. 12 is perspective view of the ball socket assembly and ball stud of FIG. 11. FIG. 13 is a cross-section view of the ball socket assembly and ball stud of FIG. 12.

The interaction between the securing substrate 106 and the boss transition wall 119 provides a controlled level of resistance to allow the ball stud 104 to be pressed into the ball socket 102 while maintaining the first stage assembly position of the ball socket assembly 100. In the first stage assembly position, due to the raised (not fully seated) position of the ball socket 102, the socket legs 107 are allowed to flex open to receive the ball head 117 with a force less than the resistance created by the interaction between the securing substrate 106 and the boss transition wall 119. Once the ball stud 104 is engaged inside the ball socket 102 the ball head 117 and the ball head cavity 127 will be in position for the second stage of assembly.

Figure 14:
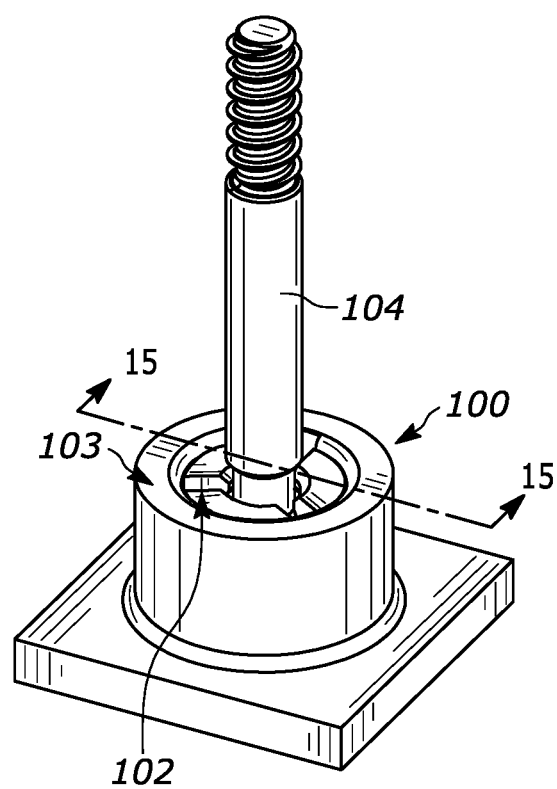
FIG. 14 is a perspective view illustrating an exemplary second stage assembly position of the ball socket assembly and ball stud.
Figure 15:
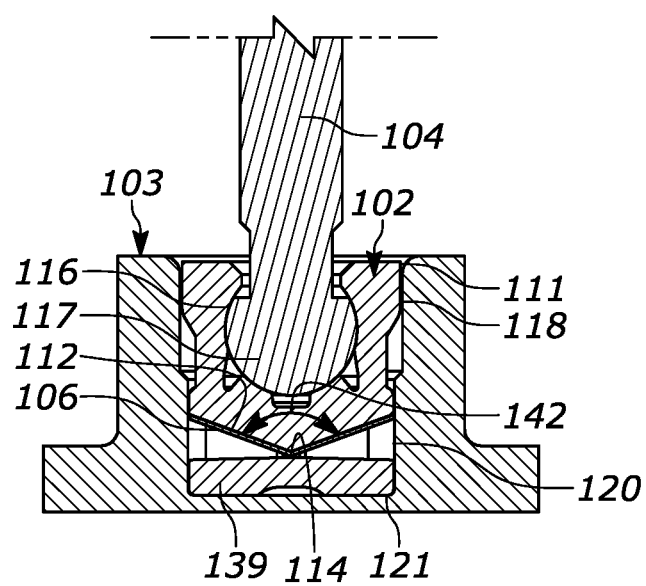
FIG. 15 is a cross-section view of the ball socket assembly and ball stud taken along line 15-15 of FIG. 14.

FIG. 14 is a perspective view illustrating an exemplary second stage assembly position of the ball socket assembly 100 and ball stud 104. FIG. 15 is a cross-section view of the ball socket assembly and ball stud of FIG. 14. Continued assembly force exerted on ball stud 104 after installation inside the ball socket 102 as illustrated in FIG. 12, overcomes the controlled resistance facilitated by the interference of the securing substrate 106 and boss transition wall 119, allowing the ball socket 102 to be further inserted into the mating boss substrate 103 until it seats at the boss bottom 121 inside the mating boss substrate 103. The upward force on the tangs 125 combined with the downward force of the bend line 114 cause the securing substrate 106 to fold up towards the lower abutment wall 112 until abutment. At the second stage assembly position the ball socket 102 is retained to the mating boss substrate 103 by engagement of the tangs 125 of the securing substrate 106 with the second boss inner passage 120. In at least some embodiments, the degree of engagement between the securing substrate 106 and the second boss inner passage 120 is controlled by a resultant bend angle 142 (see FIG. 15) of the securing substrate 106 in the second stage assembly position. The bend angle 142 of the securing substrate 106 is provided at least in part by the interaction of the securing substrate 106 with the bend line 114 of the lower abutment wall 112 and the engagement of the tangs 125 with the boss transition wall 119. The resultant bend angle 142 is generally equal to a boss angle 141 (see FIG. 9) of the lower abutment wall 112 (see FIG. 9). The boss angle 141 can vary, and in at least some embodiments, is between about 100 degrees and about 160 degrees, while in other embodiments, other angles can be utilized. The ball head 117 of the ball stud 104 is retained inside the ball socket 102 at the second stage assembly position by its interaction with the ball stud interface surfaces 116. This interaction is facilitated by the inward movement of the socket outer leg engagement surfaces 111 when the socket legs 107 are forcible pushed inward by the narrower first boss inner passage 118 as increased installation force is applied to the ball stud 104. In this final position, the socket legs 107 are fully constrained inside the first boss inner passage 118, which restrains any opening of the ball socket 102 when a pull out force is applied to the ball stud 104, thereby providing high levels of retention for a ball head 117 with or without an undercut at any allowable axial angle.

Figure 16:
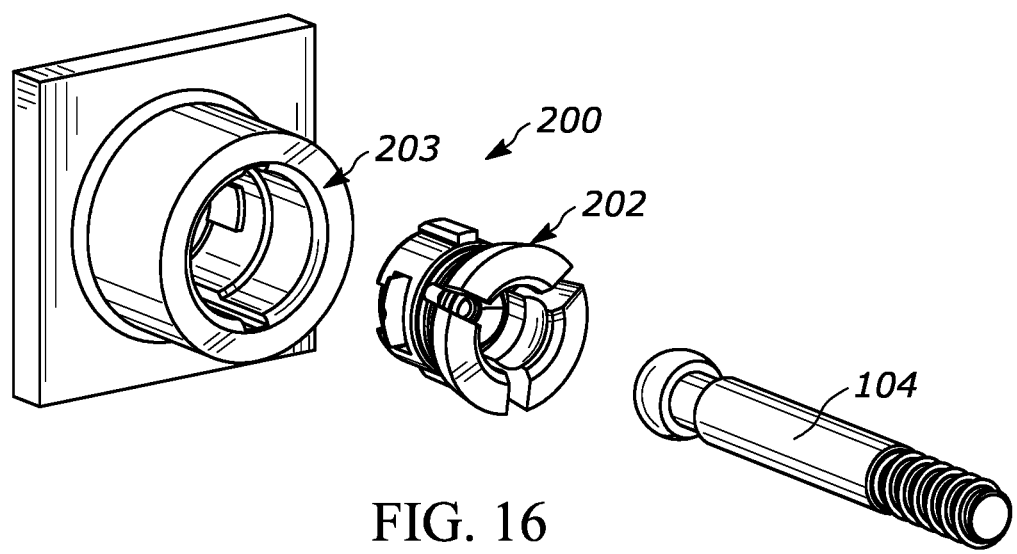
FIG. 16 is a perspective view of the ball stud and an exemplary second embodiment of the ball socket assembly.
Figure 17:
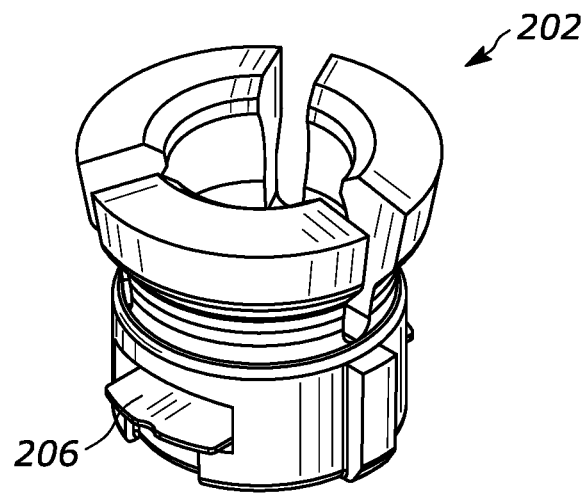
FIG. 17 is a top perspective view of a ball socket of FIG. 16.
Figure 18:
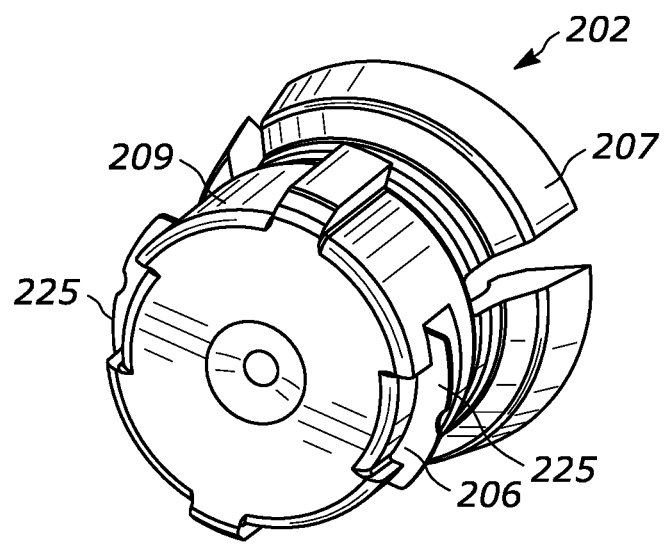
FIG. 18 is a bottom perspective view of the ball socket of FIG. 16.
Figure 19:
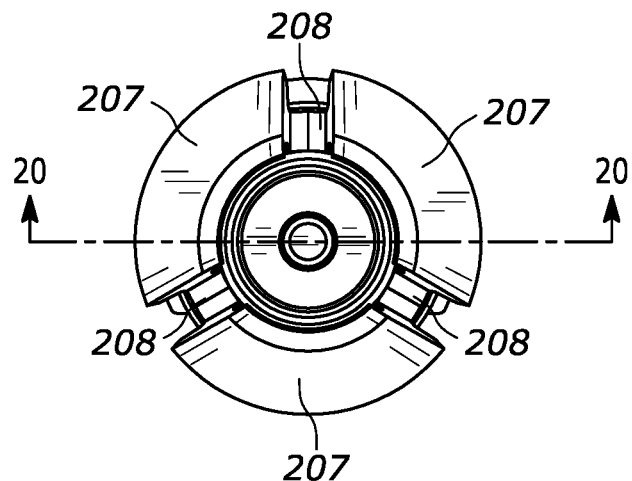
FIG. 19 is a top view of the ball socket of FIG. 16.
Figure 20:
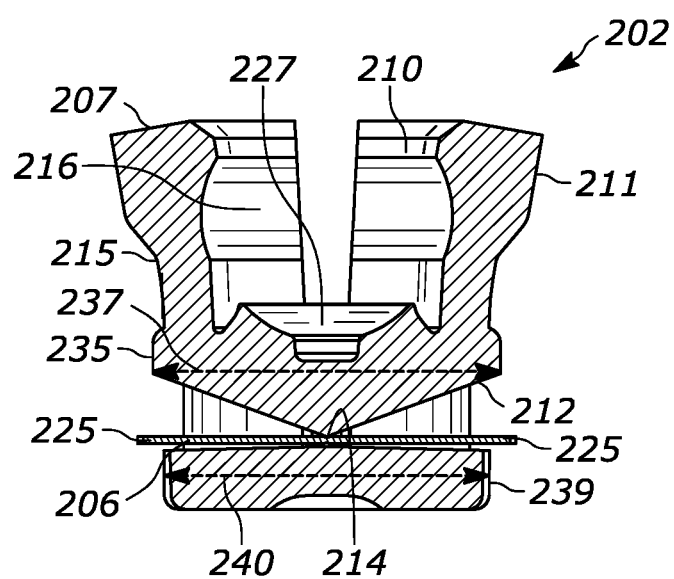
FIG. 20 is a cross-section view of the ball socket taken along lines 20-20 of FIG. 19.
Figure 21:
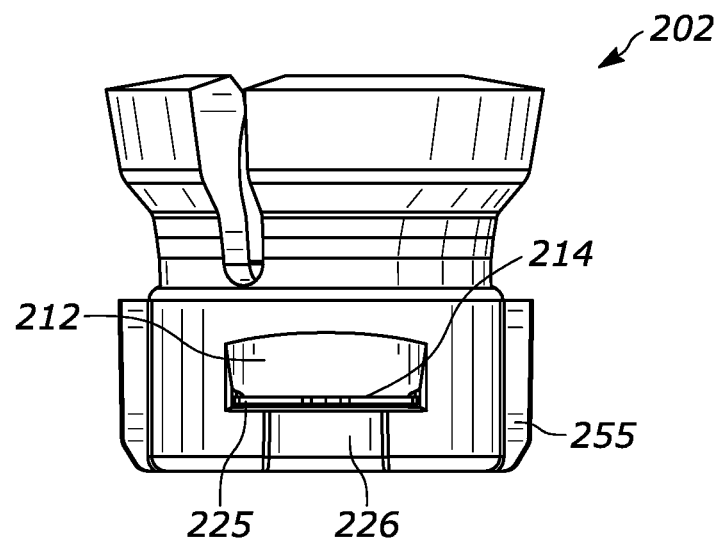
FIG. 21 is a side view of the ball socket of FIG. 16.
Figure 22:
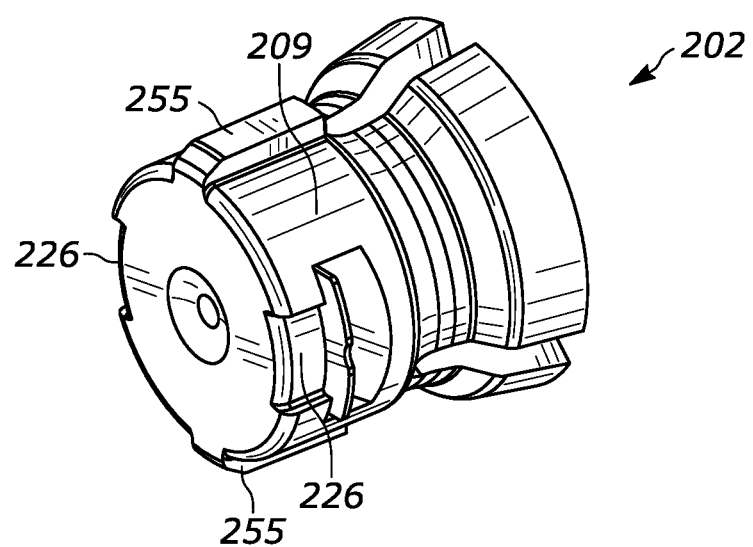
FIG. 22 is a bottom perspective view of the ball socket of FIG. 16.

FIG. 16 is a perspective view of the ball stud 104 and an exemplary second embodiment of the ball socket assembly 200, which includes ball socket 202 and mating boss substrate 203. FIGS. 17-22 illustrative various views of the ball socket 202. The ball socket 202 is substantially similar to ball socket 102, although it further includes a plurality of securing substrate support slots 226 (FIG. 22) and socket alignment ribs 255. As ball socket 202 includes many elements found in ball socket 102, these similar elements have been labelled similarly, with the notion of using a two-hundred series numbering (i.e., 102/202, 115/215, 139/239, etc.), such numbering indicates like elements performing like functions.

Figure 23:
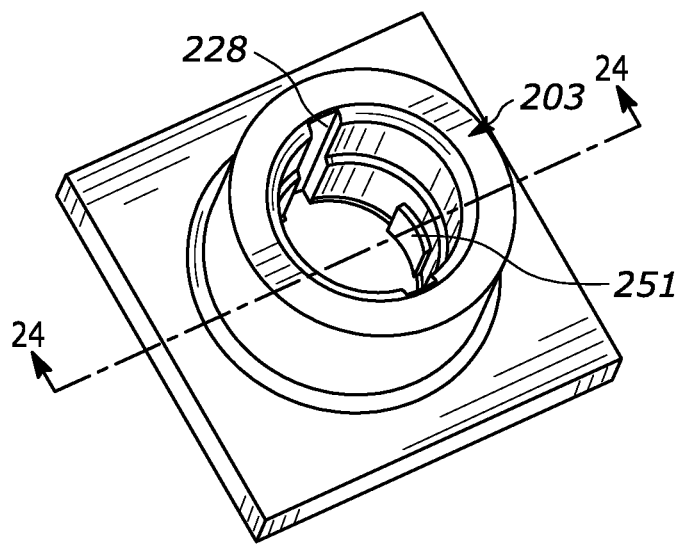
FIG. 23 is a perspective view of the mating boss substrate of FIG. 16.
Figure 24:
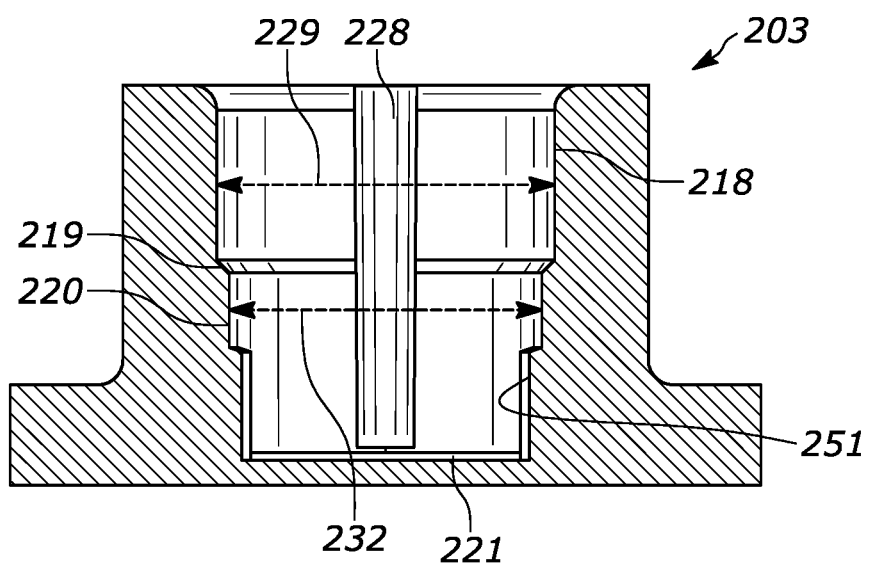
FIG. 24 is a cross section view of the mating boss substrate taken along lines 24-24 of FIG. 23.

FIG. 23 is a perspective view of the mating boss substrate 203. FIG. 24 is a cross section view of the mating boss configuration of FIG. 23. In at least some embodiments, the mating boss substrate 203 includes a first boss inner passage 218 having a first passage inside diameter 229, a second boss inner passage 220 having a second passage inside diameter 232, a boss transition wall 219 that extends between the first boss inner passage 218 and second boss inner passage 220, a plurality of securing substrate supports 251 extending inward from the second boss inner passage 220, a boss bottom 221, and a plurality of alignment slots 228 extending through both the first boss inner passage 218 and the second boss inner passage 220. In at least some embodiments, the first passage inside diameter 229 is greater than the second passage inside diameter 232.

The illustrated securing substrate supports 251 and alignment slots 228 represent one of multiple geometries that could be utilized to aid in the orientation and assembly process. In addition, the mating boss substrate 203 can take numerous forms including various shapes, sizes, and materials, and can be included as an integral part of an automotive component/assembly (e.g., automotive headlamp housing) or as a stand-alone component that is securable to an automotive component/assembly.

Figure 25:
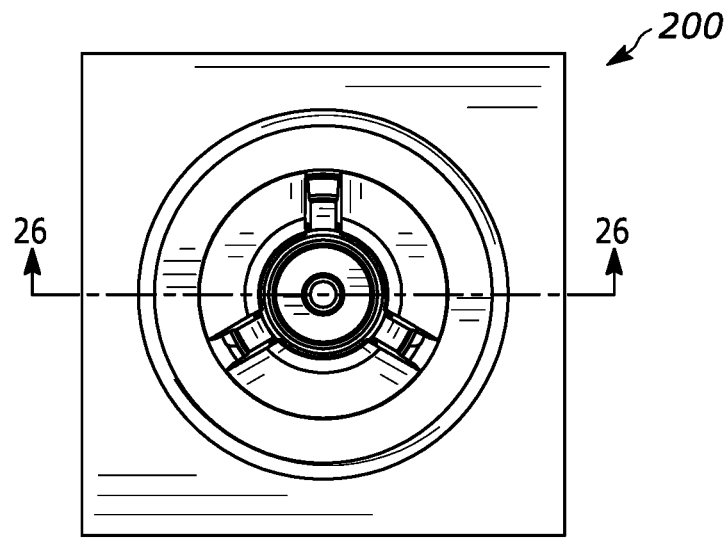
FIG. 25 is a top view of the ball socket assembly of FIG. 16 with the ball socket assembled with the mating boss substrate in an exemplary first stage assembly position.
Figure 26:
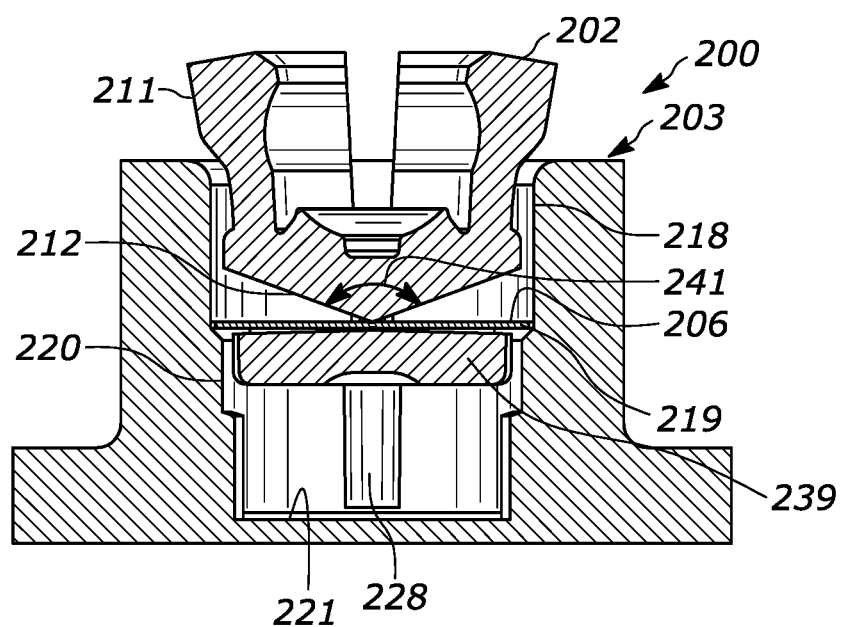
FIG. 26 is a cross-section side view of the ball socket assembly taken along line 26-26 of FIG. 25.
Figure 27:
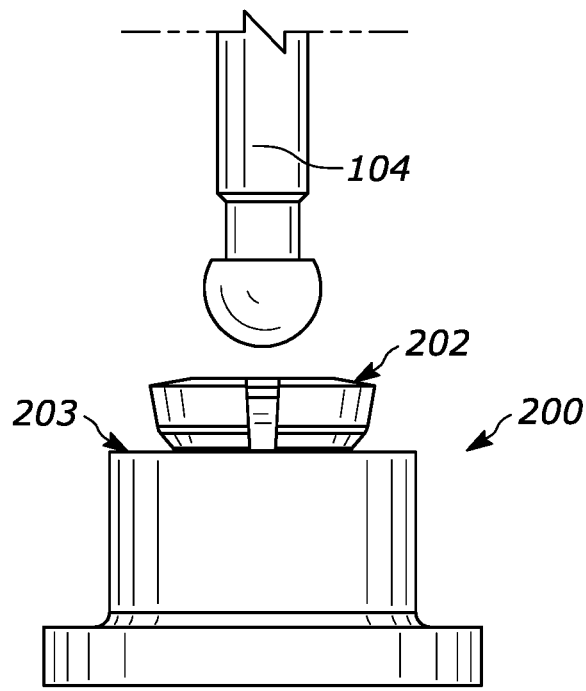
FIG. 27 is a side view illustrating an exemplary first stage assembly position of the ball socket in the mating boss substrate, and with the ball stud shown prior to installation into the ball socket.

FIG. 25 is a top view of the ball socket assembly 200 with the ball socket 202 assembled with the mating boss substrate 203 in an exemplary first stage assembly position with the tangs 225 resting on the boss transition wall 219. FIG. 26 is a cross-section side view of the ball socket assembly 200. FIG. 27 is a side view illustrating the first stage assembly position of the ball socket 202 in the mating boss substrate 203, and with the ball stud 104 shown prior to installation into the ball socket 202.

Figure 28:
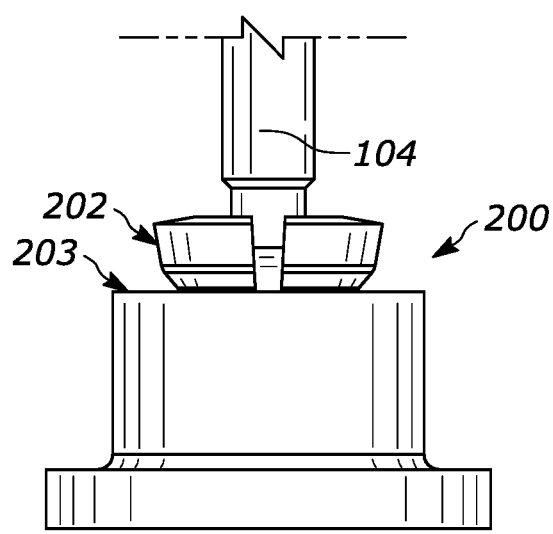
FIG. 28 is a side view of the first stage assembly position of the ball socket in the mating boss substrate with the ball stud installed in the ball socket.
Figure 29:
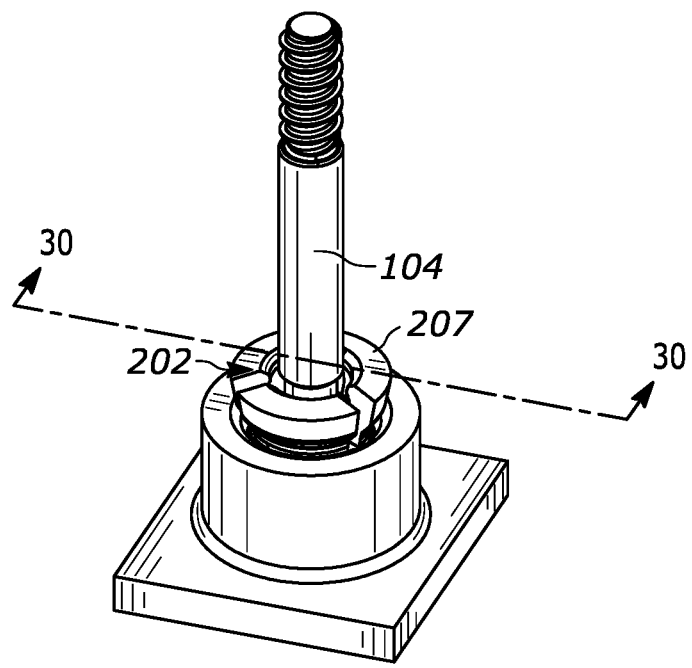
FIG. 29 is a top perspective view of the first stage assembly position of the ball socket in the mating boss substrate with the ball stud installed in the ball socket.

FIG. 28 is a side view of the first stage assembly position of the ball socket 202 partially in the mating boss substrate 203 and with the ball stud 104 installed in the ball socket 202. FIG. 29 is a top perspective view of the first stage assembly position of the ball socket in the mating boss substrate with the ball stud installed in the ball socket.

Figure 30:
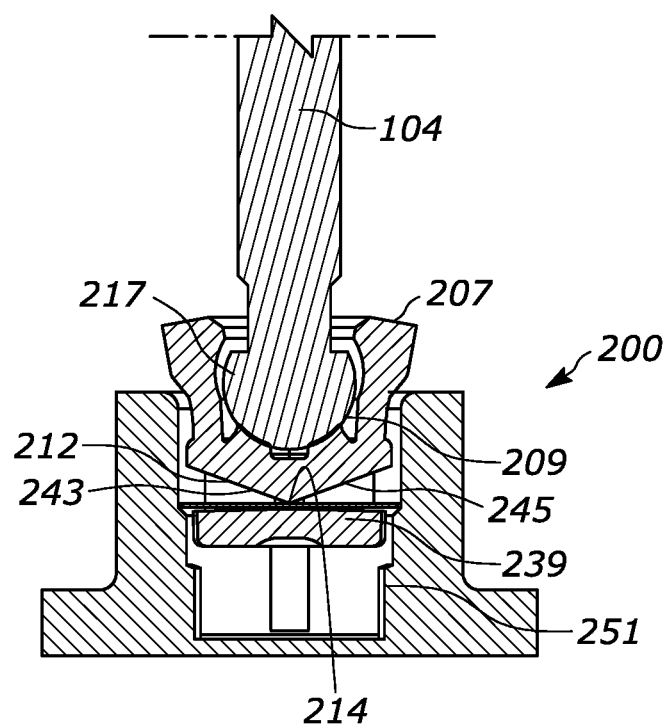
FIG. 30 is a cross-section view of the ball socket assembly and ball stud taken along line 30-30 of FIG. 29.

FIG. 30 is a cross-section view of the ball socket assembly 200 and ball stud 104 of FIG. 29. In the first stage assembly position, the ball socket 202 is installed into the mating boss substrate 203 at a controlled height by utilizing the interaction between the securing substrate 206 and the boss transition wall 219. Retention of the ball socket 202 in the mating boss substrate 203 is controlled by the interaction of the tangs 225 (i.e., their outside edges) of the securing substrate 206 engaging the boss transition wall 219 by a controlled level of interference. Center alignment of the ball socket 202 relative to the mating boss substrate 203 in the first stage assembly position is controlled by the interaction between the socket base 209 and the second boss inner passage 220, as well as the interaction between the socket alignment ribs 255 and the alignment slots 228.

The interaction between the securing substrate 206 and boss transition wall 219 provides a controlled level of resistance to allow the ball stud 104 to be pressed into the ball socket 202 while maintaining the first stage assembly position. At the first stage assembly position the socket legs 207 are allowed to flex open to receive the ball head 117 with a force less than the resistance created by the interaction between the securing substrate 206 and the boss transition wall 219. Once the ball stud 104 is engaged inside the ball socket 202, the ball head 117 and the ball head cavity 227 will be in contact for the stage two assembly process.

Figure 31:
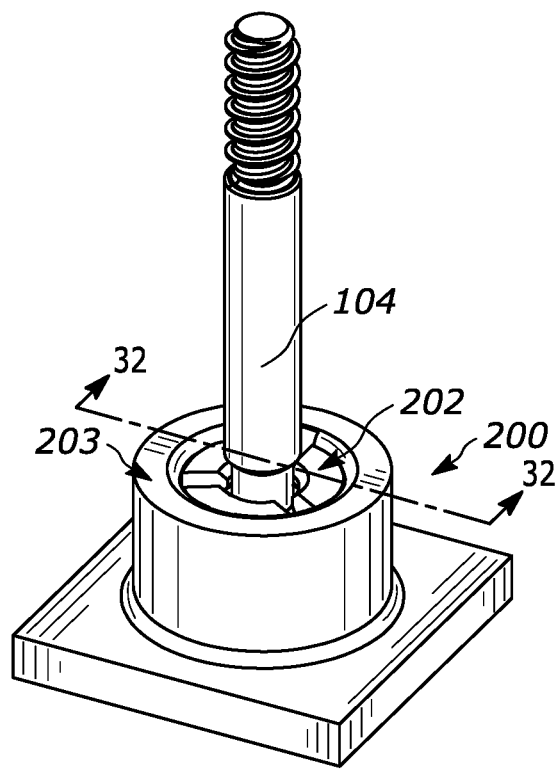
FIG. 31 is a perspective view illustrating an exemplary second stage assembly position of the ball socket assembly and ball stud.
Figure 32:
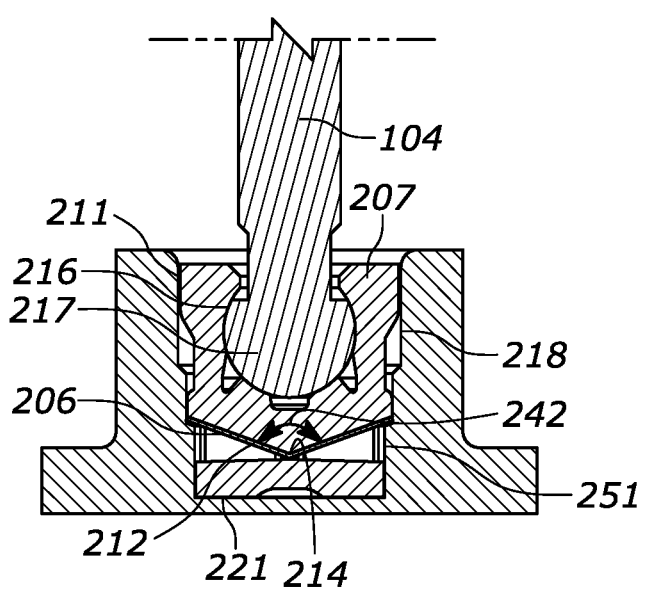
FIG. 32 is a cross-section view of the ball socket assembly and ball stud taken along line 32-32 of FIG. 31.

Continued assembly force exerted on ball stud 104 after installation inside the ball socket 202 overcomes the controlled resistance facilitated by the interference of the securing substrate 206 and boss transition wall 219 allowing the ball socket 202 to be inserted until it seats with the boss bottom 221 inside the mating boss substrate 203, as seen in FIG. 31, which provides a perspective view illustrating an exemplary second stage assembly position of the ball socket assembly 200 and the ball stud 104. FIG. 32 is a cross-section view of the ball socket assembly 200 and ball stud 104 of FIG. 31.

At the second stage assembly position the ball socket 202 is retained to the mating boss substrate 203 by the means of engagement between the outside edges of the securing substrate 206 and the second boss inner passage 220. The degree of engagement between the securing substrate 206 and the second boss inner passage 220 is controlled at least in part by the bend angle 242 of the securing substrate 206 in the second stage assembly position. The bend angle 242 is controlled at least in part by the securing substrate's interaction with the socket bend line 214, the lower abutment wall 212, a boss angle 241 (see FIG. 26) of the lower abutment wall 212 (see FIG. 30), and the boss transition wall 219. The resultant bend angle 242 is generally equal to the boss angle 241 of the lower abutment wall 212). The boss angle 241 can vary, and in at least some embodiments, is between about 100 degrees and about 160 degrees, while in other embodiments, other angles can be utilized.

When a pull out force is applied to the ball socket 202 the securing substrate supports 251 in the mating boss substrate 203 serve to interact with the securing substrate 206 by preventing the securing substrate 206 from bending downward which would release the tension of the tangs 225 against the walls of the second boss inner passage 220. The ball head 117 of the ball stud 104 is retained inside the ball socket 202 at the second stage assembly position by its interaction with the ball stud interface surfaces 216. This interaction is facilitated by the inward movement of the socket legs 207 which occurs when the socket outer leg engagement surfaces 211 interact with the first boss inner passage 218. When completely installed, the socket legs 207 are fully constrained inside the first boss inner passage 218 which restrains any opening of the ball socket 202 when a pull out force is applied to the ball stud 104 providing high levels of retention for a ball head 117 with or without an undercut at any allowable axial angle.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A ball socket assembly comprising:
  a ball socket comprising:
    a socket base having a plurality of socket legs extending therefrom, wherein the socket legs include ball stud interface surfaces forming a ball cavity for receiving and selectively engaging a ball head of a ball stud;
    a plurality of slots extending between the plurality of socket legs;
    a lower abutment wall having a bend line and situated in the socket base; and
    a flexible securing substrate having a plurality of tangs and positioned under the lower abutment wall and substantially centered about the bend line, wherein the tangs extend outward from the socket base; and
  a mating boss substrate comprising:
    a first boss inner passage having a first passage inside diameter;
    a second boss inner passage having a second passage inside diameter, wherein the first passage inside diameter is greater than the second passage inside diameter;
    a boss transition wall that extends between the first boss inner passage and the second boss inner passage; and
    a boss bottom situated under the second boss inner passage;
  wherein when the ball socket is inserted into the mating boss substrate, the tangs abut the boss transition wall and bend about the bend line to engage with the second boss inner passage and retain the ball socket to the mating boss substrate.

2. The ball socket assembly of claim 1, wherein the socket base further includes an upper base portion with an upper base portion diameter and a lower base portion with a lower base portion diameter.

3. The ball socket assembly of claim 2, wherein the first boss inner passage is sized and shaped to matingly receive therein the upper base portion of the ball socket, and the second boss inner passage is sized and shaped to matingly receive therein the lower base portion of the ball socket.

4. The ball socket assembly of claim 3, wherein the lower abutment wall is generally V-shaped, extending upwards from the bend line and away from the lower base portion.

5. The ball socket assembly of claim 3, wherein the securing substrate is substantially planar.

6. The ball socket assembly of claim 4, wherein the securing substrate is sized to pass through the first boss inner passage and abut the boss transition wall.

7. The ball socket assembly of claim 6, wherein the lower abutment wall includes a first abutment surface and a second abutment surface, wherein a bend angle of about 100 degrees to about 160 degrees extends between the first abutment surface and the second abutment surface.

8. The ball socket assembly of claim 1, wherein the mating boss substrate further includes a plurality of securing substrate supports extending inward from the second boss inner passage.

9. The ball socket assembly of claim 8, wherein the securing substrate supports are sized to abut the tangs of the securing substrate as the socket base progresses into the second boss inner passage, causing the tangs to bend upwards.

10. The ball socket assembly of claim 9, wherein the mating boss substrate further includes a plurality of alignment slots extending through both the first boss inner passage and the second boss inner passage.

11. The ball socket assembly of claim 10, wherein the ball socket further includes a plurality of socket alignment ribs extending from the socket base for mating engagement with the alignment slots.

12. The ball socket assembly of claim 11, wherein the ball socket further includes a plurality of securing substrate support slots in the socket base.

13. The ball socket assembly of claim 12, wherein the mating boss substrate further includes a plurality of securing substrate supports extending inward from the second boss inner passage, and wherein the securing substrate support slots matingly receive the securing substrate supports.

14. A ball socket assembly comprising:
a ball socket comprising:
  a socket base having an upper base portion and a lower base portion, and a plurality of socket legs extending from the socket base, wherein the socket legs include ball stud interface surfaces forming a ball head cavity for receiving and selectively engaging a ball head of a ball stud;
  a lower abutment wall having a central bend line and situated in the socket base; and
  a flexible securing substrate having a plurality of tangs and positioned under the lower abutment wall; and
a mating boss substrate comprising:
  a first boss inner passage sized and shaped to matingly receive therein the upper base portion of the ball socket;
  a second boss inner passage, wherein the second boss inner passage is sized and shaped to matingly receive therein the lower base portion of the ball socket; and
  a boss transition wall that extends between the first boss inner passage and the second boss inner passage;
  wherein when the ball socket is inserted into the mating boss substrate, the tangs abut the transition wall and bend about the bend line to engage with the second boss inner passage and retain the ball socket to the mating boss substrate.

15. The ball socket assembly of claim 14, wherein each of the socket legs include a socket outer leg engagement surface that tapers downward toward the socket base to provide an at least partial interference fit with the first boss inner passage.

16. The ball socket assembly of claim 15, wherein the lower abutment wall is generally V-shaped extending upwards from the bend line and away from the lower base portion to form a first abutment surface and a second abutment surface.

17. The ball socket assembly of claim 16, wherein the securing substrate is planar.

18. The ball socket assembly of claim 17, wherein the securing substrate is sized to pass through the first boss inner passage and the tangs of the securing substrate are sized to abut the second boss inner passage as the ball socket is inserted into the mating boss substrate.

19. The ball socket assembly of claim 18, wherein abutment of the tangs with the second boss inner passage causes the securing substrate to bend upon further insertion of the ball socket into the mating boss substrate.

20. The ball socket assembly of claim 19, wherein the ball socket further includes a plurality of socket alignment ribs extending outward from the socket base, and wherein the mating boss substrate further includes a plurality of alignment slots extending through both the first boss inner passage and the second boss inner passage for receiving the socket alignment ribs.

* * * * *